United States Patent [19]

Shirahata et al.

[11] 4,363,899
[45] Dec. 14, 1982

[54] PROCESS FOR CROSS-LINKING POLYESTER SERIES RESIN

[75] Inventors: Isao Shirahata, Chigasaki; Nobu Kitamura, Hiratsuka; Nobuyuki Nakamura, Fujisawa; Hisako Hori, Tokyo, all of Japan

[73] Assignee: The Furukawa Electric Co., Ltd., Tokyo, Japan

[21] Appl. No.: 260,690

[22] Filed: May 5, 1981

[30] Foreign Application Priority Data

Dec. 18, 1980 [JP] Japan ................................. 55-179527

[51] Int. Cl.³ ..................... C08G 63/76; C08F 283/00
[52] U.S. Cl. .................................. 525/437; 524/440; 524/605; 528/275
[58] Field of Search ................ 260/45.75 C; 525/437; 528/275; 524/440, 605

[56] References Cited

U.S. PATENT DOCUMENTS

| | | | |
|---|---|---|---|
| 3,021,305 | 2/1962 | Goldberg | 260/47 |
| 3,833,542 | 9/1974 | Lazarus et al. | 260/45.75 C |
| 3,856,743 | 12/1974 | Balsacq | 260/45.75 C |
| 3,992,480 | 11/1976 | Dorfman et al. | |

FOREIGN PATENT DOCUMENTS

1023562  3/1966  United Kingdom .

OTHER PUBLICATIONS

Nature, London, No. 4982, (Apr. 24, 1965).
Makromalejulare Chemie, 110(1967), 180–184, (NR. 2584).
K. Yoda, A. Tsuboi, M. Wada and R. Yamadera, J. Appl. Polymer Sci., 14 2357–2376, (1970).
D. L. Nearly and L. Jane Adams, J. Polym. Sci., Part A-1 9, 2063–2070, (1971).
Philip A. Spanninger, J. Polym. Sci. Polymer Chemistry, Edition 12, 709–717, (1974).

Primary Examiner—Lucille M. Phynes
Attorney, Agent, or Firm—Frishauf, Holtz, Goodman & Woodward

[57] ABSTRACT

Copper powder or a copper compound is mixed with a substantially linear polyester series resin, and the resultant resin composition is formed into a predetermined shape. Thereafter, the resin composition is heated to a temperature above the melting point of the resin in an oxygen-containing atmosphere for cross-linking the polyester series resin.

19 Claims, 1 Drawing Figure

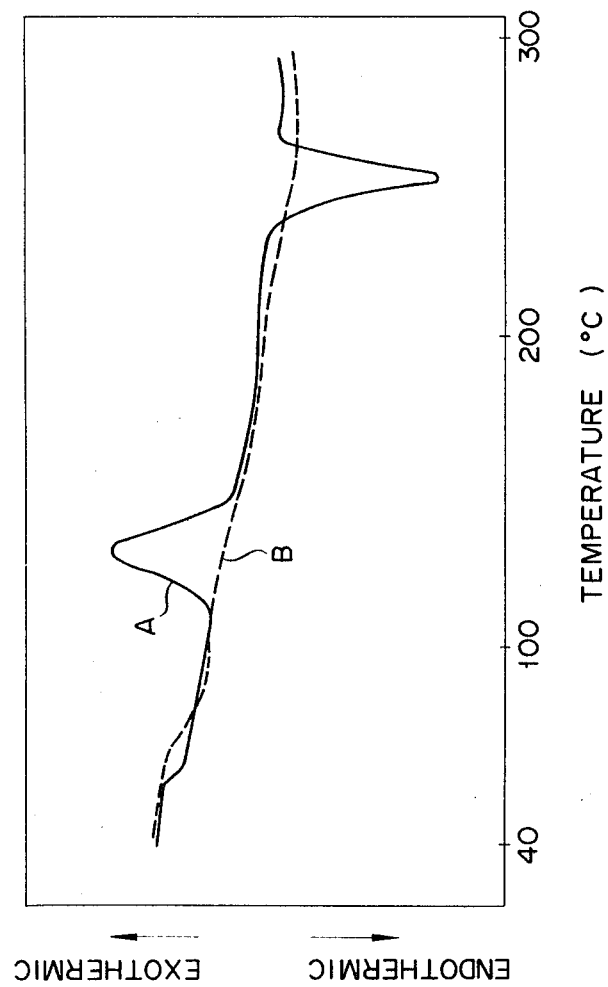

PROCESS FOR CROSS-LINKING POLYESTER SERIES RESIN

The present invention relates to a process for cross-linking a linear polyester series resin.

It is known that when a linear polyester series resin, for example, polyethylene terephthalate, is heated in air in a stainless steel tray to a temperature above its melting point, a gel is produced within the resin due to cross-linking (J. Appl. Polymer Sci., 14 2357 (1970)). However, simultaneously with the cross-linking, weight loss occurs due to the cleavage of the main chain, evaporation of the low molecular-weight material, sublimation and so on. Although the resin treated under these conditions has a molecular structure involving a three-dimensional network, namely a cross-linked structure, it has a component significantly different from that before the cross-linking of the resin, and cannot be supplied as the material for industrial application. The reaction rate of the cross-linking is also slow.

The present inventors have made extensive studies to develop the cross-linking technique for a linear polyester series resin, which many produce a cross-linked polyester series resin having various characteristics satisfactory for industrial application. As a result of such studies, it has been found that a cross-linked polyester series resin with improved heat resistance, chemical resistance and mechanical characteristics may be produced at a high rate of cross-linking without a significant weight loss by the following procedure: mixing a compound of copper such as an organic copper compound, pulverized copper, or a pulverized inorganic copper compound with a substantially linear polyester series resin consisting of, as a main component, an ester comprising an acid component composed mainly of an aromatic dicarboxylic acid or an aromatic dicarboxylic acid which is replaced in part with aliphatic carboxylic acid, and an aliphatic diol or an aromatic diol; forming this resin composition into a predetermined shape; and heating the resin composition to a temperature above the melting point thereof in an oxygen-containing atmosphere. The present invention has thus been established.

The process for cross-linking a linear polyester series resin according to the present invention is a cross-linking process utilizing heat, and is characterized in that the cross-linking of the linear polyester series resin is performed satisfying the following three conditions: copper is present in the reaction system; oxygen is present in the reaction system; the heating temperature is above the melting point of the resin used.

This invention can be more fully understood from the following detailed description when taken in conjunction with the accompanying drawing, in which:

The attached drawing shows the DSC (differential scanning calorimetry) curves of the film before heat treatment (sample A) and of the film after heat treatment (sample B) for Example 1 of the present invention.

Although details are unknown, the compound containing copper is assumed to have the following function in the cross-linking process of a linear polyester series resin according to the present invention. As was previously described (with reference to J. Appl. Polymer Sci., 14 2357 (1970)), when a linear polyester series resin is heated to a temperature above the melting point thereof in an oxygen-containing atmosphere, a series of cross-linking reactions occur involving oxidation of resin, the cleavage of the main chain, formation of free radicals, and cross-linking between molecules. When copper is not present in the resin, the weight loss caused by sublimation, evaporation of the low molecular-weight material produced by the oxidation decomposition reaction, and so on, are also caused. However, when copper is present in the resin, before the thermal oxidation decomposition reaction of the resin, a series of cross-linking reactions consisting of oxidation of resin, the cleavage of the main chain, formation of free radicals, and cross-linking between molecules is considered to be caused efficiently by the catalytic function of the copper so that the weight loss may be insignificant and the characteristics may be stable. This catalytic function is peculiar to copper and is not possessed by other metrals; it forms the characteristic part of the present invention.

When cross-linking progresses in a polyester series resin composition containing a copper compound, heated to a temperature above its melting point in an oxygen-containing atmosphere, the form of the copper in the resin which facilitates the cross-linking reaction therein is not clear. However, the copper is presumed to be present in the resin in the form of ions. The concentration of copper ions in the resin which is sufficient for effecting cross-linking (hereinafter referred to as the "effective copper content") is at least 0.02% by weight based on the weight of the polyester series resin. The upper limit of the effective copper content is preferably 2% by weight or less based on the weight of the polyester series resin, so as not to adversely affect the properties of the resin composition such as the mechanical characteristics. The most preferred range of the effective copper content is 0.05 to 1% by weight.

A copper powder or copper compound to be mixed with a linear polyester series resin may include pulverized copper, a pulverized inorganic copper compound, an organic copper compound or the like.

The copper and inorganic copper compound may include copper, cuprous oxide, cupric oxide, cuprous chloride, cupric chloride, cuprous bromide, cupric bromide, cuprous iodide and so on. Since these have poor compatibility with the linear polyester series resins to be mixed therewith, they are preferably mixed in pulverized form and are present in the resin in the form of dispersed particles. When the resin composition obtained by mixing copper or an inorganic copper compound with a linear polyester series resin is heated to a temperature above the melting point of the resin, copper ions are thought to be transferred from the surfaces of the particles of copper or the inorganic copper compound, thus acting as a catalyst for the cross-linking reaction of the resin.

Considering the catalytic effect per unit weight and the resultant effect on the mechanical properties of the resin, the size of the particles of copper or the inorganic copper compound is preferably small and normally less than $100\mu$.

The amount of copper or inorganic copper compound to be mixed with the linear polyester series resin is preferably 0.5 to 10 parts by weight based on 100 parts by weight of the linear polyester series resin, so as to attain the effective copper content described above.

The organic copper compound may include copper salts of organic acids such as copper acetate, copper naphthenate, copper oleate, copper stearate, and copper dimethyldithiocarbamate; copper chelate compounds such as copper acetylacetonate; and copper salts of 2-mercaptobenzimidazole used as an antioxidant. Since these organic copper compounds have superior compatibility with the linear polyester series resins, most of the copper in the organic copper compound functions is thought to facilitate the cross-linking of the resin. The amount of the organic copper compound to be mixed with the linear polyester series resin needs only to be so set that the copper content contained in the organic copper compound is within the range preferable for the effective copper content. The amount of the organic copper compound is, in general, preferably 0.1 to 5 parts by weight based on 100 parts by weight of the linear polyester series resin. Since organic copper compounds have superior compatibility with linear polyester series resins as has been described hereinabove, they are particularly preferably for use as the compound containing copper according to the present invention.

The aromatic dicarboxylic acid constituting the acid component of the linear polyester series resin may include, for example, terephthalic acid, isophthalic acid, naphthalene dicarboxylic acid, diphenyl dicarboxylic acid, diphenyl sulfone dicarboxylic acid, diphenoxyethane dicarboxylic acid, diphenyl ether dicarboxylic acid, methyl terephthalate, and methyl isophthalate. Terephthalic acid is particularly preferred. The aliphatic dicarboxylic acid, such as succinic acid, adipic acid or sebacic acid, may be included in an amount of 30 mol% or less, preferably 20 mol% or less, based on the amount of the aromatic dicarboxylic acid as the acid component.

The aliphatic diol constituting the linear polyester series resin may include, for example, ethylene glycol, propylene glycol, butylene glycol, hexane diol and decane diol. The aromatic diol may include, for example, 4,4'-dihydroxydiphenyl ether, bis(4-hydroxyphenyl)sulfide, bis(4-hydroxyphenyl)sulfone, bis(4-hydroxyphenyl)ketone, bis(4-hydroxyphenyl)methane, 1,1-bis(4-hydroxyphenyl)ethane, and 2,2-bis(4-hydroxyphenyl)propane. Ethylene glycol and butylene glycol are particularly preferred as the aliphatic diol and 2,2-bis(4-hydroxyphenyl)propane is preferred as the aromatic diol. A portion of the aliphatic diol may be replaced by an oxyalkylene glycol such as polyethylene glycol or polybutylene glycol.

Among the linear polyester series resins made of the acid component and the diol component as stated hereinbefore, a general-purpose resin having relatively favorable physical properties, such as polyethylene terephthalate, polybutylene terephthalate, polyethylene naphthalate, poly-2,2-bisparaphenylenepropylidene terephthalate is preferred.

In the process of the present invention, oxygen is employed for oxidizing the resin during heating and producing free radicals which can in turn contribute to the cross-linking between the molecules. Accordingly, the process of the present invention requires the use of an oxygen-containing atmosphere as an essential element. Air is most often used because of its ready availability.

It is of great significance, from the viewpoint of industrial application and physical properties, that the elevation of the oxygen partial pressure in the oxygen-containing atmosphere to a level higher than the oxygen partial pressure of air under normal conditions increases both the oxygen diffusion speed and the oxygen concentration in the resin, thereby improving the cross-linking speed and density. When the oxygen partial pressure is 230 mmHg or higher, these effects become remarkable. Although the upper limit of the oxygen partial pressure is not particularly restricted, 600 mmHg would be enough, considering the safety aspects.

Processes for elevating the oxygen partial pressure in the atmosphere may include, for example, a process in which a predetermined amount of oxygen is blown into a heating furnace at atmospheric pressure; a process in which an atmosphere is obtained by premixing oxygen and a gas such as nitrogen which is inert to the cross-linking reaction so as to raise the oxygen partial pressure to a level higher than the oxygen partial pressure in air under normal conditions; and a process in which the oxygen partial pressure of an oxygen-containing gas is made higher than that of air under normal conditions by applying pressure to the gas by means of a heating furnace capable of providing pressurized conditions.

The reason why the heating temperature in the process of the present invention is limited to a temperature above the melting point of the resin used, is that, at lower temperatures, the cross-linking speed is low, the cross-linking density does not significantly increase and the resin tends to crystallize. When the heating temperature is elevated, the cross-linking speed increases. However, since the probability of thermal decomposition is also raised, the heating temperature is, in general, preferably 450° C. or less.

For particular applications, various methods may be adopted for forming the resin composition obtained by mixing copper powder or a compound containing copper with a linear polyester series resin. These methods may include: non-solvent type coating such as extrusion coating, melt dip coating, and powder dip coating for coating the resin composition on a thermally stable carrier of a predetermined shape; and solvent type coating consisting of applying a solution containing the dissolved resin composition and drying the applied layer.

When the surface of the carrier consists of copper or a copper compound, the amount of the copper compound to be mixed with the polyester series resin may be reduced. Because, the copper required for cross-linking of the resin is immediately transferred from the surface of the carrier. By heating, after forming the composition on the carrier in the form of a film of a desired thickness, at a temperature above the melting point.

When the resin composition containing the copper compound is given a predetermined shape before heat treatment, it is preferable to form it into a layer of not more than 100μ in thickness from the perspective of permeability of oxygen into the resin.

The cross-linked polyester series resin obtained according to the process of the present invention is industrially advantageous since the various characteristics of the linear polyester series resins are significantly improved, such as the thermal properties, resistance to solvents, and mechanical properties.

According to a preferable application of the present invention, a resin composition obtained by mixing a compound containing copper with a linear polyester series resin is melted and extruded on a electrically conductive wire to form a coating of several tens of microns in thickness. The resin-coated wire is heated for the cross-linking reaction by passing through a heating furnace containing an air atmosphere at a temperature above the melting point of the resin used to provide an excellent insulation-coated wire.

According to another preferable application of the present invention, the resin composition is extruded in a film form on a carrier consisting of a metal foil belt of, for example, stainless steel, or a heat-resistant plastic film such as a polyimide film or a polyoxadiazole film; the resin film is heated to a temperature above the melting point of the resin in an oxygen-containing atmosphere; and the resin film is removed from the carrier such as the heat resistant film to provide a cross-linked polyester film.

The present invention may further be used for painting in which the resin composition is applied to a shaped article by melt dip coating or powder dip coating and is thereafter heated at a temperature above its melting point in an oxygen-containing atmosphere to form a cross-linked film.

Furthermore, according to the present invention, it is possible to suitably control the degree of cross-linking of the polyester series resin for various applications according to the desired characteristics of the resultant product.

In general, significant improvements in the thermal, chemical, and mechanical properties of the resultant resin may be obtained by maintaining the gel content of the cross-linked resin at over 20%.

The gel content according to the present invention is the ratio of the undissolved portion of the resin to the weight of the sample resin when the resin is immersed in meta-cresol and heated at 90° C. for 5 hours. The gel content is a measure of the degree of cross-linking of the resin.

The present invention will now be described by way of its examples.

EXAMPLE 1

Into polyethylene terephthalate resin (produced by Teijin Limited under the trade name TETRON TR-4550BH, to be referred to for brevity as PET hereinafter) was quickly mixed 1% by weight of copper naphthenate (copper content: 0.1% by weight based on the weight of the PET) at 270° C. in a nitrogen atmosphere. After cooling, the composition was pulverized. The composition particle thus obtained was hot-pressed at 280° C. for 3 minutes with an electric heating press on a 50 μ-thick stainless steel foil. After immediate cooling with water, a 40 μ-thick film was formed.

The gel content of the film before the heat treatment (sample A) was 0%. The laminate film with the foil was heated for 2 minutes on a stainless steel plate placed in an electric furnace containing an air atmosphere at 350° C. and was thereafter cooled with air to provide a uniform and smooth film.

The film after the heat treatment (sample B) was measured for gel content, which was 89.5%, and for the weight loss upon heating, which was 1.5%.

Differential scanning calorimetry (DSC) was performed for the samples A and B. With sample A, an exothermic peak of 135° C. due to crystallization of the PET and an endothermic peak of 256° C. due to melting were observed. However, with the sample B after the heat treatment, neither the endothermic peak nor the exothermic peak was observed. From this, it was confirmed that cross-linking occurred in the PET and that a noncrystalline resin having a three-dimensional network structure was obtained for the sample B after heat treatment.

COMPARATIVE EXAMPLE 1

A laminate PET-film of 40μ thickness was formed in a manner similar to that of Example 1 on a stainless steel foil of 50μ thickness without mixing copper naphthenate into the PET of Example 1. The gel content of this film was measured to be 0%. The same film was heat-treated at 350° C. for 2 minutes under the same conditions as in Example 1, and the gel content of the resultant film was measured. No formation of gel was observed.

COMPARATIVE EXAMPLE 2

The laminate PET-film of Comparative Example 1 was heat-treated at 350° C. for 10 minutes under the same conditions as in Example 1. The gel content of this film was 64.7%. However, the weight loss of the resin upon heating reached 39.8%. The film also changed in color to black, was degraded in flexibility, and thus was not usable for industrial application.

The properties of the films of Example 1 and Comparative Examples 1 and 2 are shown in Table 1 below.

TABLE 1

| Test Item | Comparative Example 1 | Comparative Example 2 | Example 1 |
| --- | --- | --- | --- |
| Erichsen test (I) | Mostly peeled off | Mostly peeled off | Virtually no peeling |
| Chemical resistance; after immersing in 3% NaOH aq. solution at room temperature for 24 hours (Pencil hardness) | H | HB | 3H |
| Flexibility after heating at 120° C. for 1 hour (II) | no flexibility (Crystallized) | no flexibility (Crystallized) | Good |
| Cut-through temperature (°C.) (III) | 230 | 190 | 270 |
| Tensile strength (kg/cm$^2$) (IV) | 0 | 0 | 500 |
| Gel content (%) | 0 | 64.7 | 89.5 |

Notes:
(I) The laminate film of resin was pressed 6 mm outward from the rear surface using an Erichsen tester and the peeling of the film was observed.
(II) After heating at 120° C. for 1 hour, the sample was crumpled and the flexibility was observed.
(III) The test for Cut-through temperature was performed according to the process as defined in JISC-3003 13. The laminate film was placed in a thermostatic chamber then a stainless steel ball of 1.6 mm diameter with a smooth surface, normally used for rectangular wire test, was placed on the sample and was given a 1 kg load from above. An AC voltage of 100 V is applied across the sample and the stainless steel ball. The temperature was then elevated at a rate of about 2° C. /min under this condition, and the temperature at which short-circuiting occured was measured.
(IV) The sample was converted into a simple film form, by mechanically peeling off the film from the stainless steel foil for the sample of Comparative Examples 1 and 2. The sample was cut into dimensions of 10 mm in width and 40 mm in length. It was then fixed by a Schopper tensile testing machine, with the distance between the chucks being 20 mm. It was then pulled at a rate of 150 mm/min to measure the tensile strength.

COMPARATIVE EXAMPLE 3

A sample equivalent to that of Example 1 was heated for 2 minutes on a stainless steel plate placed in an electric furnace containing a nitrogen atmosphere at 350° C. The sample was thereafter cooled with water; the gel content was 0%.

EXAMPLE 2 AND COMPARATIVE EXAMPLES 4 TO 7

To prove the effectiveness of copper, various metal salts of naphthenic acid were separately added to the polyethylene terephthalate, which was the same as that used in Example 1, in such a manner that the metal content was $3 \times 10^{-3}$ gram equivalent per 100 grams of the resin. The mixture was quickly mixed and melted at 270° C. in a nitrogen atmosphere and was thereafter cooled and pulverized. The perticle thus obtained was put on a 50 μ-thick stainless steel foil, heated at 280° C. for 3 minutes using an electric heating press, and was immediately cooled with water to form an about 40 μ-thick film for each sample. These laminate films were heat-treated on a stainless steel plate placed in an electric furnace containing an air atmosphere at 350° C. for various heat treatment times to provide heat-treated samples. The data obtained by measuring the gel contents of these heat-treated samples is shown in Table 2 below. For the purpose of comparison, the corresponding data for the samples which did not contain metal salts of naphthenic acid is also shown.

TABLE 2

| Heat treatment time | Sample | | | | |
|---|---|---|---|---|---|
| | Example 2 | Comparative Example 4 | Comparative Example 5 | Comparative Example 6 | Comparative Example 7 |
| | Added metal salt | | | | |
| | Copper naphthenate | Zinc naphthenate | Cobalt naphthenate | Manganese naphthenate | Not added |
| | (%) | (%) | (%) | (%) | (%) |
| 350° C. × 1 minute | 77.3 | 0 | 0 | 0 | 0 |
| 350° C. × 2 minutes | 89.5 | 0 | 0 | 0 | 0 |
| 350° C. × 3 minutes | 92.9 | 0 | 0 | 0 | 0 |
| 350° C. × 5 minutes | 88.0 | 0 | 0 | 0 | 0 |
| 350° C. × 7 minutes | 89.1 | 30.9 | 15.2 | 0 | 15.9 |
| 350° C. × 10 minutes | 96.9 | 74.0 | 53.8 | 0 | 64.7 |

As is evident from the results shown in Table 2, with the sample in which copper naphthenate was added (copper content in the PET: 0.1% by weight), the gel content was 77.3% after heat treatment at 350° C. for 1 minute, thus providing significantly good results. In contrast, with the samples in which the zinc salt or the cobalt salt of naphthenic acid was added, gelation was observed only after heat treatment at 350° C. for 7 minutes, which is not significantly better than the result obtained for the sample in which no such salt was added. With the sample in which manganese naphthenate was added, no gel content was observed, thus providing no effect.

EXAMPLES 3 TO 6

Films, 20 μ-thickness, were formed on a 50 μ-thick stainless steel foil under the same conditions as in Example 1, except that copper acetylacetonate was used instead of copper naphthenate.

The laminate films were heated for 40 seconds on a stainless steel plate placed in an electric furnace containing an air atmosphere at 350° C., and were thereafter cooled with air. The gel contents of the heat-treated samples thus obtained are shown in Table 3 below.

TABLE 3

| Item | Sample | | | |
|---|---|---|---|---|
| | Example 3 | Example 4 | Example 5 | Example 6 |
| Content of copper acetylacetonate in % by weight (based on the weight of the PET) | 0.3 | 1 | 3 | 5 |
| Content of copper in % by weight (based on the weight of the PET) | 0.072 | 0.24 | 0.72 | 1.2 |
| Gel content in % | 69.5 | 96.1 | 99.5 | 98.2 |

TABLE 3-continued

| Item | Sample | | | |
|---|---|---|---|---|
| | Example 3 | Example 4 | Example 5 | Example 6 |
| Cut-through temperature (°C.) | 250 | 275 | 270 | 260 |

Note:
The gel content of the samples before the heat treatment was 0%.

EXAMPLE 7

Copper stearate was added in an amount of 1% by weight (0.1% by weight as the copper content) to polybutylene terephthalate TUFPET N-1000 (trade name, TOYOBO CO., LTD). After the mixture was quickly kneaded and melted at 260° C. in a nitrogen atmosphere, it was cooled and pulverized.

The particle was hot-pressed (260° C.) on a 50 μ-thick stainless steel foil and was immediately cooled with water to form a 40 μ-thick film.

The resultant laminate film was heated at 300° C. for 3 minutes on a stainless steel plate placed in an electric furnace containing an air atmosphere, and was thereafter cooled with air. The gel content of the heat-treated sample so obtained was 73.2%. The gel content of before the heat treatment was 0%.

EXAMPLE 8

Copper oleate was added in an amount of 0.5% by weight (0.05% by weight as the copper content) to a linear saturated polyester resin VYLON 200 (trade name, TOYOBO CO., LTD.; softening point, 163° C.). The mixture was quickely mixed and melted at 220° C. in a nitrogen atmosphere. After cooling, it was formed into pellets.

The pellets thus obtained were hot-pressed (220° C. for 3 minutes) on a 50 μ-thick stainless steel foil, and was immediately cooled with water to form a 30 μ-thick film. The laminate film was then heated at 300° C. for 2 minutes in an electric furnace containing an air atmosphere and was thereafter cooled with air. The gel content of the sample so obtained after heat treatment was 55.6%. The gel content of the sample before the heat treatment was 0%.

EXAMPLE 9

In dichloroethane were dissolved 100 parts by weight of poly-2,2-bis-p-phenylenepropylidene terephthalate resin U polymer-U-4015 (trade name, UNITIKA, LTD.; hereinafter referred to as U-polymer for brevity; specific gravity, 1.24), and 1.5 parts by weight of copper acetylacetonate (copper content in the U-polymer: 0.36% by weight) to provide a resin solution of about 20% by weight solid content. The resultant solution was applied to a 100 μ-thick aluminum foil and dried to form a 50 μ-thick film. The resultant film with the aluminum foil attached thereto was heated at 370° C. for 1 minute on a stainless steel plate placed in an electric furnace containing an air atmosphere and was thereafter cooled with air. The gel content of the sample so obtained after heat treatment was 87.5%. The Cut-through temperature was 330° C. (See Example 1).

Before the heat treatment, the gel content of the sample was 0% and the Cut-through temperature was 223° C.

EXAMPLE 10

Copper powder (200 mesh) was added in an amount of 1% by weight of polyethylene terephthalate (same as in Example 1). The mixture was quickly mixed and melted at 270° C. in a nitrogen atmosphere. After cooling, the mixture was pulverized. The composition particles thus obtained were hot-pressed at 280° C. for 3 minutes on a 50 μ-thick stainless steel foil, and was immediately cooled with water to form a 50 μ-thick film. The gel content of the sample (II) before the heat treatment was 0%. The resultant laminate film was heated at 350° C. for 2 minutes on a stainless steel plate placed in an electric furnace containing an air atmosphere, and was thereafter cooled with air. The gel content of the sample (I) after the heat treatment was 87.5%.

The weight loss on heating of the resin during the heat treatment was 0.8%.

To confirm the effect of the addition of the copper powder, a 50 μ-thick PET film was formed on a 50 μ-thick stainless steel foil without adding any copper powder to the resin. The laminate film was heat-treated under the same conditions (350° C., 2 minutes) to provide a sample (II) whose gel content was 0%. The laminate film which heat-treated at 350° C. for 10 minutes, had a gel content of 64.7%. However, the weight loss caused by heating of the resin reached 39.8% by weight. It was thus confirmed that thermal decomposition progressed to a considerable degree.

Differential scanning calorimetry (DSC) was performed for the resultant samples (I) and (II). With the sample (II), an exothermic peak of 135° to 140° C. due to crystallization of the PET, and an endothermic peak of 256° C. due to melting, were observed. However, with the sample (I) which had undergone heat treatment, neither the endothermic nor the exothermic peak was observed. From these DSC results, it was confirmed that cross-linking of the PET occurred as a result of the heat treatment, and that a noncrystalline resin having a three-dimensional network structure was obtained.

EXAMPLE 11

A 60 μ-thick film was formed on a 50 μ-thick stainless steel foil in a manner similar to that in Example 10 except that a powder (10μ in particle size) of cuprous oxide was used instead of the copper powder.

The laminate film was heated at 370° C. for 1 minute on a stainless steel plate placed in an electric furnace containing an air atmosphere and was thereafter cooled with air. The gel content of the heat-treated sample so obtained was 85.6%.

EXAMPLE 12

Copper powder (200 mesh) was added in an amount of 5% by weight to a polybutylene terephthalate (same as in Example 7). The mixture was quickly mixed and melted at 260° C. in a nitrogen atmosphere. The mixture was cooled and pulverized.

The particles of the resultant composition were hot-pressed at 260° C. for 3 minutes on a 50 μ-thick stainless steel foil. They were immediately cooled with water to form a 40 μ-thick film. The film so obtained was heated at 300° C. for 3 minutes on a stainless steel plate placed in an electric furnace containing an air atmosphere and was thereafter cooled with air.

The gel content of the heat-treated sample thus obtained was 85.2%. The gel content of the sample before the heat treatment was 0%.

EXAMPLE 13

A powder of cupric oxide (10μ) was added in an amount of 3% by weight to a linear saturated polyester resin (same as in Example 8). The mixture was quickly mixed and melted at 220° C. in a nitrogen atmosphere. After cooling, the composition was pelletized. The pellets thus obtained were hot-pressed at 220° C. for 3 minutes on a 50 μ-thick stainless steel foil, and was immediately cooled with water to form a 50 μ-thick film. The resultant laminate film was heated at 300° C. for 4 minutes in an electric furnace containing an air atmosphere and was thereafter cooled with air. The gel content of the heat-treated sample was 80.5% and the gel content of a sample before the heat treatment was 0%.

EXAMPLE 14

A resin composition was prepared by mixing 1% by weight (0.24% copper content of the PET) of copper acetylacetonate to the same PET as used in Example 1. This resin composition was applied by extrusion on an aluminum wire of 0.85 mm diameter at 270° C. cylinder temperature and 290° C. die temperature to form a resin film, 22 to 25μ in thickness. The resin-coated wire was passed at a rate of 5 m/min through a 5 m-long furnace containing an air atmosphere at 450° C. to provide an insulated wire. The resin film was removed from the resultant insulated wire. The gel content of the film was 93.8%.

COMPARATIVE EXAMPLE 8

The same resin composition as the one used in Example 14 was applied by extrusion on an aluminum wire of 0.85 mm diameter in the same way as in Example 14 and was immediately cooled with water to form a resin film, 22 to 25μ in thickness, thus providing an insulated wire. The resin film removed from the resultant insulated wire had a gel content of 0%.

COMPARATIVE EXAMPLE 9

The same PET as used in Example 14, but without the addition of copper acetylacetonate, was extruded on an aluminum wire of 0.85 mm diameter in the same way as in Example 14 to form a film, 22 to 25μ in thickness. The resultant wire was passed at a rate of 5 m/min through a 5 m-long furnace containing an air atmosphere at 450° C. to obtain an insulated wire. The resin film removed from the insulated wire had a gel content of 0%.

Various characteristics of the insulated wires obtained in Example 14 and Comparative Examples 8 and 9 as measured according to JIS C 3210 are shown in Table 4 below.

TABLE 4

| | | Example 14 | Comparative Example 8 | Comparative Example 9 |
|---|---|---|---|---|
| Flexibility (wound around wire of equal diameter) | | Good | Good | Good |
| Resistance to heat deterioration (wound after 200° C. × 6 hours) | | 1 × Good | 5 × Not good | 5 × Not good |
| Heat shock resistance (150° C. × 1 hour after wound) | | Good | Good | Good |
| Chemicals resistance (pencil hardness after immersed at room temperature for 24 hours) | $H_2SO_4$ aq. solution (1.2 specific gravity) | 4H | H | H |
| | NaOH aq. solution (1%) | 3H | H | H |
| Scrape resistance (times, 440g) | | 33 | 19 | 20 |
| Dielectric breakdown voltage (kV) | | 45 | 37 | 39 |
| Crazing resistance (number of pinholes after 3% elongation) | | 1 | Many | Many |

EXAMPLE 15

Copper naphthenate was added in an amount of 2.5% by weight (0.25% copper content of the PET) to a polyethylene terephthalate resin (same as in Example 1). The mixture was quickly mixed and melted at 270° C. in a nitrogen atmosphere. After cooling, the mixture was pulverized.

The resultant particle was hot-pressed at 280° C. for 3 minutes with an electric hot press on a 50 μ-thick stainless steel foil and was immediately cooled with water to form a 30 μ-thick film. A gas mixture of oxygen and nitrogen with the predetermined oxygen partial pressure being 304 mmHg was flowed at a rate of 30 l/min from the bottom of an electric furnace having a capacity of 10 liters to control the temperature within the furnace at 350° C.

A laminate sample obtained by the process described above comprising the stainless steel foil and the PET containing copper naphthenate was heated for 30 seconds on a stainless steel plate placed in an electric furnace wherein the oxygen partial pressure was 304 mmHg. The sample was thereafter cooled with air. The gel content of the film of the sample after the heat treatment was 92.5% and the gel content of the film of the sample before the heat treatment was 0%.

COMPARATIVE EXAMPLE 10

For comparison, a laminate sample (before the heat treatment) consisting of the stainless steel foil and the PET containing copper naphthenate, as obtained in Example 15, was heated for 30 seconds on a stainless steel plate placed in an electric furnace containing an air atmosphere at 350° C. The sample was thereafter cooled with air. The gel content of the film of the heat-treated sample thus obtained was 71.4%.

EXAMPLE 16

In dichloroethane were dissolved 100 parts by weight of poly-2,2-bis-paraphenylenepropylidene terephthalate resin (same as in Example 9) and 1.5 parts by weight of copper acetylacetonate (copper content in the polymer: 0.36% by weight) to provide a resin solution of about 20% by weight solid content. The resultant solution was applied on a 100 μ-thick aluminum foil and was dried to form a 30 μ-thick film as a sample.

A gas mixture of nitrogen and oxygen with the predetermined partial pressure of oxygen being 456 mmHg was flowed at a rate of 30 l/min from the bottom of an electric furnace of 10-liter capacity to control the furnace temperature at 370° C.

A laminate sample obtained by the process described above comprising the aluminum foil and the polymer containing copper acetylacetonate was heated for 20 seconds on a stainless steel plate placed in an electric furnace wherein the partial pressure of oxygen was 456 mmHg. The sample was thereafter cooled with air. The gel content of the film of the resultant heat-treated sample was 90.5%. The gel content of the film before the heat treatment was 0%.

COMPARATIVE EXAMPLE 11

For comparison, two laminate samples (before heat treatment) as obtained in Example 16 comprising the aluminum foil and the polymer containing copper acetylacetonate were heat-treated at 370° C. for 20 and 60 seconds, respectively, on a stainless steel plate placed in an electric furnace containing an air atmosphere. The samples were thereafter cooled with air. The gel contents of the films of the heat-treated samples so obtained were 52.4% and 90.2%, respectively.

What we claim is:

1. A process for cross-linking a polyester series resin characterized by forming into a predetermined shape a resin composition comprising a substantially linear polyester series resin and a copper source material selected from the group consisting of copper powder and copper compounds and heating said composition to a temperature above the melting point of said resin in an oxygen-containing atmosphere to cross-link said polyester resin.

2. The process according to claim 1, wherein said substantially linear polyester series resin is a linear polyester series resin mainly made of an aromatic dicarboxylic acid or an aromatic dicarboxylic acid wherein an aliphatic dicarboxylic acid is replaced for part thereof, and an aliphatic diol or an aromatic diol.

3. The process according to claim 2, wherein said substantially linear polyester series resin is a polymer selected from the group consisting of polyethylene terephthalate, polybutylene terephthalate, polyethylene naphthenate and poly-2,2-bis-paraphenylpropylidene terephthalate.

4. The process according to claim 1 or 3, wherein said copper source material is pulverized copper whose particle size is less than 100μ.

5. The process according to claim 1 or 3, wherein said copper source material is a copper compound selected from the group consisting of pulverized inorganic copper compounds and organic copper compounds.

6. The process according to claim 5, wherein said compound containing copper is an organic copper compound.

7. The process according to claim 1, wherein said oxygen-containing atmosphere is a gas having an oxygen partial pressure above the oxygen partial pressure of air under normal conditions.

8. The process according to claim 1 or 3, wherein said oxygen-containing atmosphere is air at a pressure above atmospheric pressure.

9. The process according to claim 7, wherein the oxygen partial pressure in said oxygen-containing atmosphere is from 230 to 600 mmHg.

10. The process according to claim 1 or 3, wherein said resin composition is formed into a film having a thickness less than 100μ.

11. The process according to claim 10, wherein said resin composition is formed into a film on an electrically conductive material.

12. The process according to claim 4, wherein the oxygen partial pressure in said oxygen-containing atmosphere is from 230 to 600 mmHg.

13. The process according to claim 5, wherein the oxygen partial pressure in said oxygen-containing atmosphere is from 230 to 600 mmHg.

14. The process according to claim 1 or 3, wherein said copper source material is in an amount sufficient to provide between 0.02% and 2% by weight of effective copper based on the weight of said linear polyester series resin.

15. The process according to claim 4, wherein said copper source material is in an amount sufficient to provide between 0.05% and 1% by weight of effective copper based on the weight of said linear polyester series resin.

16. The process according to claim 6, wherein said copper source material is in an amount sufficient to provide between 0.05% and 1% by weight of effective copper based on the weight of said linear polyester series resin.

17. The process according to claim 9, wherein said copper source material is in an amount sufficient to provide between 0.05% and 1% by weight of effective copper based on the weight of said linear polyester series resin.

18. The process according to claim 12, wherein said copper source material is in an amount sufficient to provide between 0.05% and 1% by weight of effective copper based on the weight of said linear polyester series resin.

19. The process according to claim 1 or 3, wherein said copper source material is an organic copper compound present in an amount sufficient to provide between 0.5% and 1% effective copper based on the weight of said linear polyester series resin; wherein the oxygen partial pressure in said oxygen-containing atmosphere is from 230 to 600 mmHg; and wherein said resin composition is formed into a film having a thickness less than 100μ on an electrically conductive material.

* * * * *